United States Patent [19]

Bray

[11] 4,447,965

[45] May 15, 1984

[54] PROCESS AND APPARATUS FOR DRYING WITH LATENT HEAT RECOVERY

[75] Inventor: Steven C. Bray, Chillicothe, Ill.

[73] Assignee: General Electric Company, Schenectady, N.Y.

[21] Appl. No.: 323,202

[22] Filed: Nov. 20, 1981

Related U.S. Application Data

[63] Continuation of Ser. No. 156,337, Jun. 4, 1980, abandoned.

[51] Int. Cl.³ ............................................. F26B 3/04
[52] U.S. Cl. .......................................... 34/27; 34/32; 34/76; 34/77; 34/83; 55/17
[58] Field of Search ................... 55/1, 17, 434; 34/27, 34/32, 73, 76, 77, 83, 84, 133

[56] References Cited

U.S. PATENT DOCUMENTS 2,716,289  8/1955  Lauck ................................. 34/27
3,319,347  5/1967  Bentley ............................... 34/32

*Primary Examiner*—Larry I. Schwartz
*Attorney, Agent, or Firm*—Paul J. Checkovich; James C. Davis, Jr.; Marvin Snyder

[57] ABSTRACT

Vapor laden effluent from a drying chamber is dehumidified by condensing the vapor through the acceleration thereof, and by subsequent condensate removal as through inertial separation. The resultant effluent is recirculated to the drying chamber after being heated and pressurized.

18 Claims, 1 Drawing Figure

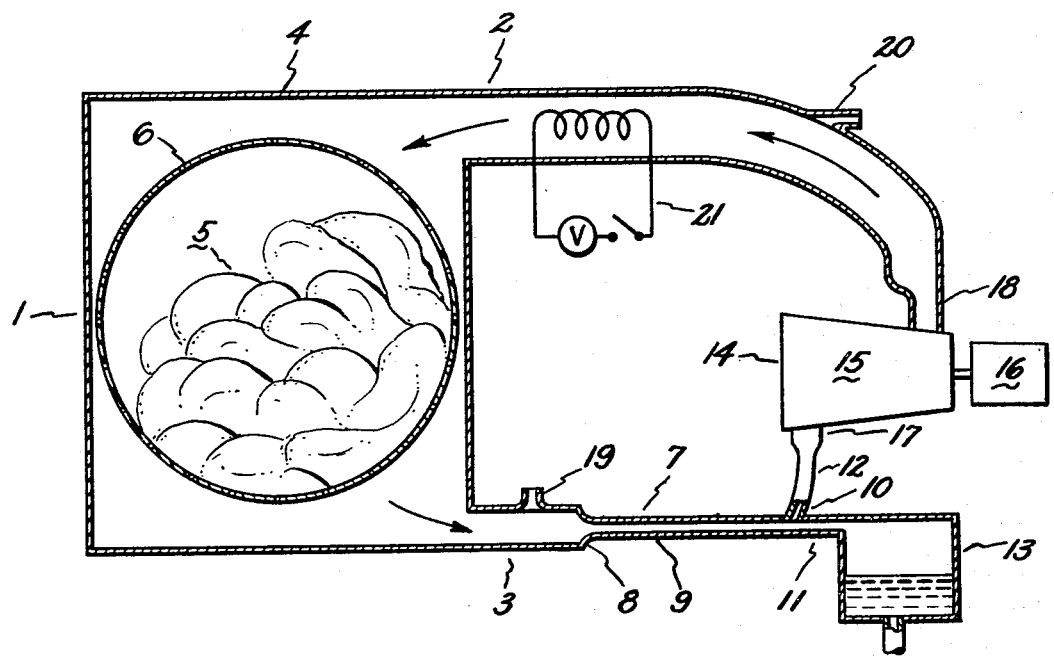

PROCESS AND APPARATUS FOR DRYING WITH LATENT HEAT RECOVERY

This application is a continuation of application Ser. No. 156,337, filed June 4, 1980 now abandoned.

BACKGROUND OF THE INVENTION

This invention relates generally to processes and apparatus for drying, and more particularly, to drying processes and apparatus in which a drying fluid is dehumidified and recirculated.

In most drying processes a volatile liquid is driven off from an article of interest by providing the article with sufficient heat to vaporize the liquid. This heat is often provided by a drying fluid such as hot air circulated into contact with the article in a drying chamber. The resulting vaporized liquid is admixed with the drying fluid and is exhausted from the drying chamber. Because of design simplicity as well as the historically low cost of energy the effluent mixture of drying fluid and vapor has typically been simply vented to the atmosphere. A residential clothes dryer is an example of this approach. However, such an approach inefficiently utilizes the heat of evaporation supplied to the system.

More specifically, most of the heat of evaporation supplied to a drying process may be recovered as latent heat by condensing the vaporized liquid before it is exhausted from the system. In certain applications, such as in the drying of wood, the use of a vapor compression heat pump in a drying process has been suggested to enable the recovery of available latent heat. In such a system latent heat is recovered from vaporized fluid exhausted from a drying chamber by condensation on a heat pump evaporator. The recovered latent heat is then transferred at the heat pump condenser to drying fluid entering the drying chamber.

Although drying processes involving heat pumps enable the recovery of latent heat, the use of such processes is effectively limited in scope. For example, the high capital costs associated with heat pump-coupled dryers render them unacceptable for many applications. Similarly, heat pump-coupled dryers are often susceptible to heat exchanger fouling such as in certain clothes drying applications.

Accordingly, it is an object of the present invention to provide a new and improved process and apparatus for drying.

It is another object of the present invention to provide a new and improved process and apparatus for drying in which latent heat of vaporization is efficiently recovered.

It is still another object of the present invention to provide an efficient low cost drying process and apparatus which obviates the need for heat exchangers and is adaptable to a wide range of applications.

SUMMARY OF THE INVENTION

The above and other objects and advantages are achieved in a drying process in which liquid is continuously extracted from an article as a vapor by contacting the article in a drying chamber with a drying fluid supplied to the chamber at a temperature in excess of the liquid vaporization temperature. The extracted vapor is removed from the chamber in an effluent mixture with the supplied drying fluid. The effluent drying fluid is then recycled to the drying chamber by first accelerating the effluent mixture sufficiently to effect the condensation of at least a portion of the extracted vapor. The condensed vapor is then removed from the effluent mixture in a liquid extracting means and the resultant effluent mixture is directed to a compressor where the temperature and pressure thereof is increased prior to returning it to the drying chamber. In embodiments of the present invention hereindescribed, a portion of the effluent mixture removed from the drying chamber is vented from the process prior to the acceleration of the remaining effluent mixture. Similarly, a quantity of makeup drying fluid and additional heat may be added to the recycled drying fluid during the return of the fluid to the drying chamber. An apparatus for carrying out this process is also disclosed.

BRIEF DESCRIPTION OF THE DRAWING

For a better understanding of the invention reference may be had to the accompanying drawing wherein:

FIG. 1 is a schematic representation of an exemplary apparatus for drying clothes constructed in accordance with an embodiment of the present invention.

DESCRIPTION OF THE INVENTION

As depicted in FIG. 1 for an exemplitive clothes drying application, a drying apparatus according to the present invention includes a drying chamber 1 which is supplied with a heated drying fluid such as air through an inlet 2. In a drying process an effluent mixture of drying fluid and vaporized liquid is withdrawn from the drying chamber through an outlet 3. The effluent mixture is dehumidified, heated and pressurized in a recycling process prior to being returned to the drying chamber 1 through the inlet 2.

The drying chamber 1 herein illustrated includes an outer structure 4 designed to direct drying fluid towards articles to be dried such as clothes depicted at 5. In order to optimize the utilization of drying fluid, the outer structure 4 is preferably constructed so as to be substantially leak proof during the operation of the device. As depicted, the clothes 5 are contained in a perforated rotatable drum 6 typical of most conventional clothes dryers which acts to facilitate the heating of the clothes by the drying fluid. The outlet 3 is disposed through the outer structure 4 to enable the removal of the effluent mixture of drying fluid and vaporized liquid from the drying chamber 1.

A fluid accelerating means 7 is connected to receive the effluent mixture from the outlet 3 and to accelerate it sufficiently so as to condense vapor in the mixture. More specifically, an effluent mixture is continually accelerated in a fluid accelerating means 7 to effect the condensation of vapor through a conversion of latent heat energy to kinetic energy. As depicted in FIG. 1, the fluid accelerating means advantageously comprises a converging nozzle having a rapidly converging section 8 in which an effluent mixture is quickly accelerated to near condensation conditions. The nozzle contour is then transformed into a relatively slowly converging section 9 in which the mixture acceleration rate is decreased while vapor is being condensed. This configuration permits the mixture to be accelerated up to but not including Mach 1 due to well-known characteristics of converging nozzles. In this manner vapor is efficiently condensed while minimizing the thermodynamic non-equilibrium associated with high velocity applications near the dewpoint conditions of a fluid which typically depresses the dewpoint with respect to equilibrium conditions.

Both sections (8 and 9) of the converging nozzles are also contoured to minimize friction-related energy losses therein so as to maximize cycle efficiency. Similarly, the nozzle sections are beneficially designed to avoid the formation of shear forces which might otherwise act to reduce condensate droplet size. In this manner subsequent condensate collection which is dependent on droplet size is improved.

In order to accelerate an effluent mixture to a suitable velocity for condensation to occur, the nozzle section 9 must include a predetermined minimum cross-sectional flow area for a given pressure drop across the nozzle. However, the requisite condensation velocity is also a function of the vapor to be condensed. For the application depicted in FIG. 1 in which the effluent mixture comprises air and water vapor, the requisite condensation velocity is at least about Mach 0.5 but less than Mach 1, and is more preferably between at least about Mach 0.65 and about Mach 0.9. Correspondingly, the minimum nozzle cross-sectional flow area for such an application is preferably between about 0.05 square inches to about 0.5 square inches. Within this range the flow area may be increased to allow a greater flow rate, or decreased to achieve a more complete condensation of vapor.

The fluid accelerating means 7 is connected at its outlet to a liquid extracting means 10 in which condensed vapor is removed from the effluent mixture. Although not limited thereby, the liquid extracting means 10 illustrated in FIG. 1 is an inertial separator in which centrifugal force is employed to separate the relatively heavy condensed vapor from the effluent mixture. Accordingly, the inlet of the inertial separator leads to a forked section at which a first conduit continues substantially straight ahead to a first outlet 11 for extracted liquid. A second conduit diverges from the first in a controlled curved manner and leads to a second outlet 12 for the remainder of the effluent mixture flowing into the means 10. A suitable drain means 13 is provided at the extracted liquid outlet 11 to trap condensed vapor and remove it from the system without disrupting the inertial separation process as by a large pressure drop.

It is advantageous for a liquid extracting means 10 to be capable of complete condensate extraction, since any moisture contained in the mixture exhausted through the outlet 12 must subsequently be compressed resulting in a wasteful expenditure of work with no equivalent compensating drying effect when returned to the drying chamber 1. However, the total extraction of condensed vapor typically requires additional compressor work which may outweigh any derived benefits. Thus, although complete liquid extraction is often desirable, it is not necessary for the practice of the present invention.

The resultant dehumidified effluent mixture exhausted through the second outlet 12 of the liquid extraction means 10 is returned as drying fluid to the drying chamber 1 after suitable compression. Accordingly, the outlet 12 is connected in flow communication with a compressor means 14. As illustrated, the compressor means 14 includes a centrifugal compressor 15 driven by a motor 16 and having a diffuser inlet and outlet 17 and 18, respectively. The compressor means 14 is suitably sized to heat the fluid exhausted through the outlet 12 and to increase the pressure thereof to that encountered in the drying chamber 1. The compressor outlet 18 is connected in flow communication with the drying chamber inlet 2 to complete the drying fluid recycling process.

In a preferred embodiment of the present invention, an outlet vent 19 is included in flow communication with the effluent mixture flow path intermediate the drying chamber outlet 3 and the inlet of the fluid accelerating means 7. A means 20 such as an inlet vent is also provided in flow communication with the drying chamber inlet 2 to admit makeup drying fluid thereto. Additionally, a heating means 21 such as the resistance heater depicted in FIG. 1 may be advantageously disposed in thermal contact with drying fluid flowing from the outlet of the compressor means 14 to the inlet 2 of the drying chamber.

In operation, a heated drying fluid such as air enters the drying chamber 1 through the inlet 2 and is therein contacted with articles to be dried such as the clothes 5. Through this process sufficient heat is imparted to the clothes to result in the evaporation of at least a portion of the liquid contained therein. The resultant vapor is admixed with the drying fluid and is exhausted as an effluent mixture through the drying chamber outlet 3.

The effluent mixture is suitably accelerated through the fluid accelerating means 7 such that sufficient thermal energy is converted to kinetic energy to effect the condensation of at least a portion of the vaporized liquid contained in the effluent mixture. Preferably, substantially all of the vaporized liquid is condensed in this acceleration process.

The resultant effluent mixture comprising the drying fluid which entered the drying chamber through the inlet 2, and the vapor condensed in the fluid accelerating means 7 is directed to the liquid extracting means 10. In the means 10 condensed vapor is extracted from the resultant mixture as through centrifugal force. The extracted liquid is collected in the drain 13 and removed from the process.

The resultant dehumidified effluent mixture is directed to the compressor means 14 through the outlet 12 and diffuser 17. The velocity of the dehumidified effluent mixture is decreased by the diffuser 17 whereby the pressure of the mixture is increased. Thus at least a portion of the energy imparted the the effluent mixture by the compressor means 17 can be recovered, thereby increasing the efficiency of the system. That is, the pressure rise required across the compressor for a given pressure output will be less than if none of the energy were to be recovered. The fluid entering the compressor means 14 is preferably free of vaporized liquid and condensate. However, it may include some of these constituents depending upon design considerations as noted hereinabove. The compressor means 14 provides a sufficient vacuum at the inlet 17 to cause fluid to flow from the drying chamber 1 through the fluid accelerating means 7 and into the compressor means 14. The fluid entering the compressor means 14 is heated therein and sufficiently pressurized to enable the return of the fluid to the drying chamber 1.

Although sufficient heat is typically added during the compression process in means 14, additional heat may be added to the drying fluid through the operation of the auxiliary heating means 21. Typically, such means may be selectively employed to increase the drying rate within the chamber 1 or to assist in rapidly achieving equilibrium conditions during initial system operation.

Similarly, vents 19 and 20 are provided to enable additional temperature control of the drying fluid. Thus, humid effluent mixture may be extracted through the outlet vent 19 prior to any work being done thereon. Relatively cool dehumidified makeup drying fluid such as air is then supplied through the inlet vent 20 to effect a decrease in the temperature of the drying fluid entering the drying chamber 1.

By way of example, in an exemplary clothes dryer the drying chamber 1 is held at atmospheric pressure while the maximum temperature of the clothes is limited to 144° F. The system is designed for a drying rate suitable for extracting 0.12 pounds of water per minute. For this example, it is assumed that 10 percent of the drying fluid is continuously vented and subsequently made up during the process. The fluid accelerating means 7 is a converging nozzle having a minimum cross-sectional flow area of 0.315 square inches and is effective for accelerating effluent fluid mixture entering the nozzle to a Mach number of approximately 0.86. Average efficiencies for the compressor means 14 (0.6) and for the fluid extracting means 10 (0.75) along with typical parasitic losses and power requirements of 400 watts are assumed.

Thus designed, a clothes dryer employing the present invention would require approximately 3,830 BTU's of energy to dry a 7 pound load of clothes from approximately 70 percent liquid retention to approximately 4 percent. In contrast, a conventional clothes dryer might typically require approximately 6,900 BTU's to perform an equivalent drying function.

Of course, the above-described embodiment of this invention is intended to be exemplitive and not limiting and it will be appreciated from the foregoing by those skilled in the art that many substitutions, alterations and changes may be made to the disclosed process and apparatus without departing from the spirit or the scope of the invention.

What is claimed as new and desired to be secured by Letter Patent of the United States is:

1. A drying process in which liquid is continuously extracted from an article as a vapor by contacting the article in a drying chamber with a drying fluid supplied to an inlet of said chamber at a temperature in excess of the liquid vaporization temperature and is removed from said chamber in an effluent mixture with said drying fluid, and in which the drying fluid in said effluent mixture is recycled to the drying chamber inlet by:
    (a) directing said effluent mixture to a flow accelerating means;
    (b) accelerating said effluent mixture in said flow accelerating means to a velocity less than Mach 1 in order to effect the condensation of at least a portion of said vapor;
    (c) directing the effluent mixture from said flow accelerating means to a liquid extracting means;
    (d) effecting the extraction in said liquid extracting means of condensed vapor from said effluent mixture;
    (e) directing the resultant effluent mixture from said liquid extracting means to a compressor means;
    (f) effecting a temperature and pressure increase on said resultant effluent mixture in said compressor means; and
    (g) returning said resultant effluent mixture from said compressor means to said drying chamber inlet.

2. A drying process as in claim 1 in which said effluent mixture is accelerated in said flow accelerating means to a velocity of at least Mach 0.5.

3. A drying process as in claim 1 wherein the step of directing the resultant effluent mixture from said liquid extracting means to a compressor means comprises the steps of:
    (a) directing the resultant effluent from said liquid extracting means to a diffuser means;
    (b) effecting the diffusion in said diffuser means of said resultant effluent mixture whereby the velocity thereof is decreased and the pressure thereof is increased; and
    (c) directing the resultant effluent mixture from said diffuser means to said compressor means.

4. A drying process in which liquid is continuously extracted from an article as a vapor by contacting the article in a drying chamber with a drying fluid supplied to an inlet of said chamber at a temperature in excess of the liquid vaporization temperature and is removed from said chamber in an effluent mixture with said drying fluid, and in which the drying fluid in said effluent mixture is recycled to the drying chamber inlet by:
    (a) directing said effluent mixture to a flow accelerating means;
    (b) accelerating said effluent mixture in said flow accelerating means to a velocity of at least about Mach 0.65 to about Mach 0.9 in order to effect the condensation of at least a portion of said vapor;
    (c) directing the effluent mixture from said flow accelerating means to a liquid extracting means;
    (d) effecting the extraction in said liquid extracting means of condensed vapor from said effluent mixture;
    (e) directing the resultant effluent mixture from said liquid extracting means to a compressor means;
    (f) effecting a temperature and pressure increase on said resultant effluent mixture in said compressor means; and
    (g) returning said resultant effluent mixture from said compressor means to said drying chamber inlet.

5. A drying process as in claim 1 wherein additional heat is added to said resultant effluent mixture during the return of said mixture from said compressor means to said drying chamber inlet.

6. A drying process as in claim 1 wherein a quantity of effluent mixture is removed from the drying process prior to the acceleration of the remaining effluent mixture in said fluid accelerating means.

7. A drying process as in claim 1 wherein a quantity of makeup drying fluid is added to the resulting effluent mixture while returning said mixture to the inlet of said drying chamber.

8. A drying process as in claim 1 wherein substantially all of the vapor contained in said effluent mixture is condensed during the acceleration thereof in said fluid accelerating means.

9. A drying process as in claim 1 or claim 8 wherein substantially all of the vapor condensed in said fluid accelerating means is extracted from said effluent mixture in said liquid extracting means and is removed from the drying process.

10. A drying apparatus comprising:
    a drying chamber having an inlet and outlet, a means for accelerating a fluid to a velocity less than Mach 1, having an inlet disposed in flow communication with said drying chamber outlet, a means for extracting liquid from said fluid disposed in flow communication with an outlet of said fluid accelerating means and having a first outlet for liquid extracted from said fluid and a second outlet for at least a portion of the remainder of said fluid, a drain means connected to said first outlet of said liquid extracting means, and a compressor means having an inlet disposed in flow communication with said second outlet of said liquid extracting means and having an outlet disposed in flow communication with said inlet of said drying chamber.

11. A drying apparatus as in claim 10 wherein the inlet of said compressor means comprises a diffuser means.

12. A drying apparatus as in claim 10 wherein said fluid accelerating means comprises a converging nozzle.

13. A drying apparatus as in claim 10 wherein said fluid accelerating means comprises a converging nozzle having a minimum cross-sectional flow area of between about 0.05 square inches and about 0.5 square inches.

14. A drying apparatus as in claim 10 wherein said liquid extracting means comprises an inertial separator.

15. A drying apparatus as in claim 10 wherein said drying chamber is substantially leak proof.

16. A drying apparatus as in claim 10 further comprising an outlet vent disposed in flow communication intermediate said drying chamber outlet and the inlet of said fluid accelerating means.

17. A drying apparatus as in claim 10 further comprising a means for admitting makeup drying fluid disposed in flow communication with said drying chamber inlet.

18. A drying apparatus as in claim 10 further comprising a heating means disposed in thermal contact with a flow path intermediate said compressor means outlet and said drying chamber inlet so as to enable the heating of fluid flowing therebetween.

* * * * *